United States Patent [19]

Robey et al.

[11] 4,151,266

[45] Apr. 24, 1979

[54] METHOD FOR THE CONVERSION OF ANHYDROUS SODIUM CARBONATE TO WEGSCHEIDER'S SALT

[75] Inventors: Raymond J. Robey, Waltham, Mass.; John Capozzolo, Syracuse, N.Y.

[73] Assignee: Allied Chemical Corporation, Morris Township, Morris County, N.J.

[21] Appl. No.: 918,179

[22] Filed: Jun. 22, 1978

[51] Int. Cl.$^2$ .......................... C01D 7/14; C01D 7/10
[52] U.S. Cl. ...................................... 423/425; 423/422
[58] Field of Search .................... 423/419 P, 422, 425, 423/427, 189

[56] References Cited

U.S. PATENT DOCUMENTS

| | | | |
|---|---|---|---|
| 1,473,259 | 11/1923 | Sundstrom et al. | 423/425 |
| 1,503,481 | 8/1924 | Cocksedge | 423/427 |
| 1,583,661 | 5/1926 | Cocksedge | 423/425 |
| 3,235,329 | 2/1966 | Gancy | 423/425 |
| 3,485,578 | 12/1969 | Gould | 423/425 |
| 3,695,831 | 10/1972 | Goldstein | 423/189 |
| 3,701,737 | 10/1972 | Goldstein | 423/425 |
| 3,944,500 | 3/1976 | Gancy et al. | 423/425 |
| 3,984,527 | 10/1976 | Gancy et al. | 423/425 |

FOREIGN PATENT DOCUMENTS

| | | | |
|---|---|---|---|
| 2420852 | 11/1974 | Fed. Rep. of Germany | 423/425 |
| 206372 | 11/1923 | United Kingdom | 423/425 |

Primary Examiner—O. R. Vertiz
Assistant Examiner—Gary P. Straub
Attorney, Agent, or Firm—Anthony J. Stewart; Thomas D. Hoffman

[57] ABSTRACT

A one-stage method for production of free-flowing, absorptive particles of Wegscheider's Salt ($Na_2CO_3 \cdot 3NaHCO_3$), having a low bulk density, low alkalinity and low friability, by reaction of higher bulk density, anhydrous sodium carbonate particles with carbon dioxide and steam at superatmospheric pressure is disclosed. Particles of high bulk density anhydrous sodium carbonate are introduced into a preheated reaction zone and heated to a temperature of at least about 100° F., and thence continuously contacted therein with a gaseous mixture containing from about 45 to 70 weight percent steam and 30 to 55 weight percent carbon dioxide. By preheating the reaction zone and delaying the introduction of the gaseous mixture thereto until the temperature of the particles of sodium carbonate therein is at least about 100° F., caking and coagulation of the contacted particles is substantially eliminated. The exothermic reaction mixture is maintained at a temperature from about 240° to 275° F. and at a pressure of at least about 10 psig until at least 50 weight percent Wegscheider's Salt is produced.

8 Claims, 2 Drawing Figures ent to bring the moisture content below that value. Thus, in accordance with the process of the present invention the Wegscheider's Salt product produced possesses the desirable properties comparable to those properties obtained for the product from the monohydrate disclosed in application Ser. No. 778,301. However, the starting material used in the method of the present application is the more readily available dense ash, or anhydrous sodium carbonate ($Na_2CO_3$), with a bulk density above 750 g/l, usually between about 1000 to 1200 g/l.

METHOD FOR THE CONVERSION OF ANHYDROUS SODIUM CARBONATE TO WEGSCHEIDER'S SALT

BACKGROUND OF THE INVENTION

1. Field of the Invention

This invention relates to single step, superatmospheric pressure method for the production of free flowing particles of Wegscheider's Salt ($Na_2CO_3 \cdot 3NaHCO_3$) of low bulk density from anhydrous sodium carbonate of high bulk density.

2. Description of the Prior Art

The production of alkali products contaning $Na_2CO_3$ and $NaHCO_3$ in various weight ratios is well known in the prior art.

Co-pending application Ser. No. 778,301 describes a process for producing a unique Wegscheider's Salt product from sodium carbonate monohydrate wherein the monohydrate particles are contacted with a gaseous mixture containing carbon dioxide and water at atmospheric pressure. The product so produced is composed of wegscheider's Salt needles oriented within the hexagonal crystal form of the monohydrate and has excellent flow properties. The disadvantage of this process is its requirement to employ the monohydrate as a starting material. A similar process is described in application Ser. No. 356,663 employing sodium sesquicarbonate as the starting material with a corresponding difference in the Wegscheider's Salt product. Although the product produced from the sesquicarbonate has good absorbtivity and low bulk density, the flow properties are unacceptable for certain commercial uses.

British Pat. No. 206,372 describes a process of treating sodium carbonate with a gaseous mixture of carbon dioxide and water at temperatures from 90°–100° C. to produce Wegscheider's Salt and U.S. Pat. No. 1,583,661 discloses a similar process to produce Wegscheider's Salt product composed of thin, elongated needlelike particles. In both cases the bulk density and flow properties of the product are poor.

U.S. Pat. No. 3,701,737 discloses a process of contacting sodium carbonate, sodium monohydrate or mixtures thereof with water to produce wet agglomerates which are subsequently treated with sufficient $CO_2$ at atmospheric pressure to obtain carbonated agglomerates of $NaHCO_3$ and $Na_2CO_3$ in molar ratios of 0.4:1 to 1.5:1. These carbonated agglomerates may be calcined, as described in U.S. Pat. No. 3,695,831, to form absorptive soda ash.

A process of hydrating light ash is disclosed in U.S. Pat. No. 3,719,745 wherein the free-flowing hydrated particles so produced are carbonated to saturation and thence calcined to produce low density sodium carbonate.

Due to the present environmental efforts to reduce or eliminate the phosphates present in detergents, there is a need for a product having mild alkalinity, low bulk density, low friability, good flow properties and high absorbancy of liquid surfactants. The Wegscheider's Salt compositions of Ser. No. 778,301 fill this need, and it would be desirable to produce such from commercially available soda ash.

SUMMARY OF THE INVENTION

It is accordingly one object of the present invention to provide a simple one stage method for the production of an absorptive, low bulk density, alkaline material with low friability and good flow properties.

It is a further object of the invention to provide a simple one stage process for converting a readily commercially available reactant, namely anhydrous sodium carbonate, into the free flowing, alkaline Wegscheider's Salt described in Ser. No. 778,301.

These and other objects will be apparent from the description which follows.

According to the present invention, there is provided a method for the production of free-flowing, absorptive particles of Wegscheider's Salt ($Na_2CO_3 \cdot 3NaHCO_3$), having a low bulk density, which comprises introducing anhydrous sodium carbonate particles, having a bulk density greater than about 750 g/l, into a reaction zone preheated to a temperature of at least about 200° F. (93.3° C. heating said particles to a temperature of at least about 100° F. (37.8° C.), and thence introducing to the reaction zone a gaseous mixture containing from about 45 to about 70 weight percent water and about 30 to 55 weight percent carbon dioxide. The particles of sodium carbonate are brought into intimate contact with the gaseous mixture; the pressure in the reaction zone is maintained at least about 10 psig and the temperature therein is held in the range from about 240° to 275° F. (115.6°–135° C.) until the reaction mixture contains at least about 50 weight percent Wegscheider's Salt. At this point, the free-flowing, low bulk density product particles are removed from the reaction zone and, in those instances wherein the free-moisture content exceeds about 5 weight percent, the product is air-dried to bring the moisture content below that value. Thus, in accordance with the process of the present invention the Wegscheider's Salt product produced possesses the desirable properties comparable to those properties obtained for the product from the monohydrate disclosed in application Ser. No. 778,301. However, the starting material used in the method of the present application is the more readily available dense ash, or anhydrous sodium carbonate ($Na_2CO_3$), with a bulk density above 750 g/l, usually between about 1000 to 1200 g/l.

It has been found that preheating the reactor before the gaseous mixture of carbon dioxide and steam are charged thereto is necessary to produce the desired product. Such preheating prevents steam from condensing on the reactor walls. Condensed water is believed to cause caking thereby destroying particle identity and preventing conversion into low bulk density product. Also, the introduction of the gaseous mixture into the reactor should be delayed until the solid sodium carbonate particles are preheated to at least about 100° F., to reduce the potential for caking to occur. Destruction of particle identity through caking or agglomeration prevents the gaseous mixture from reacting with individual particles of sodium carbonate. The greater the number of individual particles which are converted to Wegscheider's Salt, the lower the bulk density of the product.

The present invention provides a single stage process wherein there is no handling of the material after the charging of the reactor. The economic advantages of employing anhydrous sodium carbonate over the processes of the prior art are obvious.

In accordance with the present invention, the gaseous mixture of steam and carbon dioxide which comes into intimate contact with the preheated solid sodium carbonate can be varied from 45 to 70 weight percent, preferably 55 to 70 weight percent steam and 30 to 55 weight percent, preferably 30 to 45 weight percent carbon dioxide. The pressure in the reactor is maintained at 10 psig or higher and the temperature at 240°–275° F. until the reaction particles contain at least 50 weight percent, preferably 85 to 100 weight percent Wegscheider's Salt. At the completion of the exothermic reaction, the temperature of the materials in the reactor drops and the reactor pressure increases because the reaction with carbon dioxide ceases. At this point the free-flowing product particles, i.e., product having a value for percent flow, defined hereinbelow, of at least about 80%, are discharged from the reactor. Values less than 80% denote an unacceptable product.

The operating pressure and temperature of the reactor are important. By preheating the walls of the reactor and maintaining the temperature thereof to at least about 200° F. and delaying the introduction of the gaseous mixture until the temperature of the dense ash reaches at least about 100° F., preferably about 100° F. to 150° F., the steam condenses on the solid materials, not on the walls; the caking and agglomeration of the product is substantially eliminated and a free-flow Wegscheider's product having low bulk density is produced. Although the composition of the carbon dioxide-steam mixture can be held constant throughout the reaction, the reaction is more easily initiated if substantially pure steam is introduced by itself, since it is advantageous that the particles of dense ash be placed in a hydrated state before carbonation occurs. When the temperature of the partially hydrated particles exceeds at least about 100° F., gaseous carbon dioxide is added to the steam and the mixture is introduced into the reactor; the exothermic reaction between the solid particles and the gaseous mixture is maintained at the preferred temperature and pressure until at least about 50 weight percent, preferably 85–100 weight percent, Wegscheider's Salt is produced.

Thus, it has been found that dense ash can be employed as a starting material by employing superatmospheric pressures and by preheating the starting material and the reactor before the introduction of the gaseous mixture thereby providing for a more controlled reaction and the formation of a highly absorbant free-flowing particles of a low bulk density product. The preferred maximum temperature of the materials is 250° F. and is maintained by any convenient heating means. Since reaction temperatures above the atmospheric boiling point of water are employed, the reaction must operate at superatmospheric pressures, at least 10 psig, preferably 15–20 psig, to allow condensation of a liquid aqueous film on the surface of the solid reaction materials. It is believed a film of water on the particles of dense ash results in the hydration thereof permitting reaction with the gaseous mixture of steam and carbon dioxide. Although the preferred operating pressure is 15–20 psig, higher pressures can be employed depending on the equipment used.

DETAILED DESCRIPTION OF THE INVENTION

Figure 1:
FIG. 1 is a photograph (magnification 50X) of anhydrous sodium carbonate particles.

The process of this invention provides free-flowing, absorptive particles of Wegscheider's Salt, having a low bulk density, in the range of 350 to 500 g/l, usually 400–500 g/l. This one-stage process comprises contacting anhydrous sodium carbonate particles, preferably anhydrous sodium carbonate, or dense ash, having a high bulk density above 750 g/l, usually in the range of about 1000 to 1200 g/l, with a gaseous mixture containing from about 45 to about 70 weight percent steam and from about 30 to about 55 weight percent carbon dioxide, preferably 55 to 70 weight percent steam and 30 to 45 weight percent carbon dioxide, most preferably about 63 weight percent steam and about 37 weight percent carbon dioxide.

The present invention offers the distinct advantage of employing dense ash (anhydrous sodium carbonate) having a bulk density of about 1000–1200 g/l, i.e., a commercially available material, as starting material. Further, the present invention is composed of a single step process with no intermediate mixings or hydrations. There is no handling of the material after the initial charging of the reactor, and the gas flow rates can be held constant throughout the entire reaction.

The use of anhydrous sodium carbonate as starting material is made possible by the discovery that if the shell of the reactor were not hot at all times, then steam from the feed gas would condense on the walls of the reactor and solids would cake thereon, form lumps, thereby destroying particle identity and resulting in an unacceptable Wegscheider's Salt product. When the walls of the reactor are preheated in accord with this invention and introduction of the gases is delayed until the temperature of the dense ash is at least about 100° F., condensation of steam on the reactor walls is essentially eliminated and a free-flowing, low bulk density Wegscheider material is produced with minimal caking and scaling. While higher initial solid temperatures may be used, 150° F. has been found to be preferable initial maximum temperature since at this temperature it is believed that the liquid film on the particles is more easily formed.

Heat can be supplied by any suitable means such as for example, an electrical mantel means or steam jacket. Alternately other hot fluids can be circulated between a jacket and the reactor walls to maintain the proper temperature. In the process of the present invention, the preheated reactor is charged with particles of anhydrous sodium carbonate and sealed to maintain reactor pressures of at least about 10 psig. The temperature of the solid ash is adjusted to at least about 100° F. and rotation of the reactor or other mixing is begun to provide the necessary contact between solid and gas. The reaction is more easily initiated by charging the reactor first with pure steam until the temperature of the solids exceeds 100° F. Then a gaseous mixture of 45 to 70 weight percent steam and 30 to 55 weight percent carbon dioxide, preferably 55 to 70 steam and 30 to 45 carbon dioxide and most preferably a mixture of 63 weight percent steam and 37 weight percent carbon dioxide, is introduced into the preheated reactor, e.g., through a sparger, situated within the reactor. As the reactor rotates, the solid particles therein are continually separated, recombined and forced to flow over the sparger. Steam is added in amounts of 4.2–7.8 times the stoichiometric quantity, commonly 7.36 times the stoichiometric quantity, required for the formation of Wegscheider's Salt (Na₂CO₃.3NaHCO₃), while CO₂ is added in amounts of 1.0–1.8 times the stoichiometric quantity, commonly 1.76 times the stoichiometric quantity required. The high steam concentration in the gaseous mixture is necessary because it is believed that the dense ash must be put in some kind of hydrated form before reaction to Wegscheider's Salt occurs.

As the gaseous mixture enters the closed rotating reactor, the internal pressure increases and is maintained at about at least 10 psig, preferably at least about 15–20 psig, by venting the excess gases. The vented gases can be transferred to a water condenser wherein the gaseous mixture is cooled, the water therein condensed and the recovered carbon dioxide recycle to a mixer for reuse in the reactor, or alternately the gaseous mixture can be transferred to another process or vented to the atmosphere.

The reaction of dense ash with carbon dioxide and water is an exothermic reaction and the temperature of the solid materials within the reaction zone quickly reaches a temperature of about 240°–275° F., preferably about 250° F. This reaction temperature is maintained by any convenient heating means, until at least about 50 weight percent, preferably 85–100 weight percent Wegscheider's Salt is formed. Further, preheating the dense ash before the initiation of reaction by the introduction of the gaseous mixture, results in a more easily controlled reaction and effects the formation of a highly absorbant, free-flowing product having a bulk density only 20 to 40 percent of the dense ash feed material.

The term, "highly absorbant", describes a product which absorbs a quantity of non-ionic wetting agent or surfactant equal to from about 30 to 60 weight percent of the Wegscheider's product while maintaining good flow properties. By the phrase "free-flowing product" is meant a product which flows through an orifice at least 80% as fast as an equal volume of sand, having a standard particle size. Products with a % flow value greater than 80% are acceptable.

While we do not wish to be bound by any theory or mechanism of the reaction, we believe that the anhydrous sodium carbonate must be placed in a hydrated state, probably sodium carbonate monohydrate, before conversion to Wegscheider's Salt (Na₂CO₃.3NaHCO₃). While the exact mechanism of this conversion is unknown, the possible intermediacy of sodium bicarbonate and sodium sesquicarbonate (Na₂CO₃.NaHCO₃.2H₂O) is suggested by their occasional appearance as products along with Wegscheider's Salt. Since reaction temperatures above the atmospheric boiling point are employed for the formation of Wegscheider's Salt, the reaction of dense ash with steam and carbon dioxide must operate at superatmospheric pressures to condense a liquid aqueous film on the surface of the solids. Absent superatmospheric pressure, only unacceptable product is obtained.

At the completion of the exothermic reaction, the pressure in the reactor increases sharply since carbon dioxide is no longer being consumed and the temperature of the material begins to decrease. The pressure is most easily monitored by a suitable gauge in the reactor's exit gas line and the temperature of the solid material by a thermocouple or other suitable means in contact with the solid materials within the reaction zone.

The product is discharged and thence screened to remove oversize and undersize material.

Upon discharge from the reactor, the particles of Wegscheider's Salt can contain relatively large amounts of free-water. This free-water is exclusive of the chemically bound water present in $Na_2CO_3.NaHCO_3.2H_2O$. If this product is not dried to lower the free-water content to 5 weight percent or less, Wegscheider's Salt can decompose to give sodium sesquicarbonate and sodium bicarbonate according to the equation:

$$2H_2O + Na_2CO_3.3NaHCO_3 \rightarrow Na_2CO_3.NaHCO_3.2H_2O + 2NaHCO_3$$

While air-drying the moist product is usually sufficient to maintain the free-water content at below about 5 weight percent, an additional drying step may be added without substantially altering the process of this invention.

EXPERIMENTAL METHODS

Gas Composition

The optimum gas composition is found to be about 63 weight percent steam and 37 weight percent carbon dioxide. This gaseous mixture provides enough water to sustain the reaction and will keep excess carbon dioxide flow to the recycle at a minimum. For a 30 lb. charge of dense ash, the flow rates used are 10.9 lb/hr steam and 6.3 lb/hr carbon dioxide for 1.25 hours (75 min.). Under these conditions, there is added 7.36 times the stoichiometric amount of steam required for the formation of Wegscheider's Salt and 1.76 times the stoichiometric amount of carbon dioxide required.

Bulk Density

The bulk density (B.D.) of dense ash starting material is measured to be 1100 g/l by a method described in U.S. Pat. No. 3,944,500. Bulk densities of the product could be varied over a wide range by manipulation of reaction conditions and the method of drying.

Bulk density values could most easily be controlled by regulation of the relative amounts of CO₂ and steam in the gaseous mixture admitted to the reactor. Generally, an increase in the weight percent CO₂ in the gaseous mixture would effect an increase in the bulk density value. Conversely an increase in the steam input would result in lower B.D. values.

Non-Ionic Absorbancy

In this procedure, a liquid non-ionic wetting agent, such as, for example, Triton X-100, is added to a known weight of Wegscheider's Salt product until the mixture becomes tacky and loses its free-flowing properties. The absorbancy is reported as:

$$\% \text{ Non-Ionic Absorbancy} = \frac{\text{Weight of Wetting Agent}}{\text{Weight of Product}} \times 100$$

Typically, absorbancy of product material ranges from 30–60 percent; dense ash has an absorbancy of 10 percent.

pH at 25° C.

The pH of a 1 weight percent aqueous solution of dense ash in water at 25° C. is 11.0. The pH of an aqueous solution, 1 weight percent in the Wegscheider's Salt product varied from 9.50–9.70 depending upon the percent composition of the product.

Flow Quality

The apparatus to determine flow quality consists of a two quart mason jar with a ⅛" hole drilled in its bottom. The cap is replaced by a special aluminum nozzle. The jar is filled to overflowing and the excess scraped off the top with a straight edge. The nozzle is screwed in place, the jar inverted, and the time required for the detergent to flow out determined to the nearest 0.1 of a second. The average of these readings is compared with the time required for a sample of $-10+60$ mesh sand to flow out of the bottle. The flow quality or % flow, is defined as:

$$\% \text{ Flow} = \frac{\text{Flow time for sand}}{\text{Flow time for product}} \times 100$$

The flow quality of dense ash is about 91 percent. Higher values denote a superior product, i.e. free-flowing. Values less than about 80 percent are unacceptable.

Friability

Friability is defined as the sum of two other properties, breakage and attrition. A sample of product of $-10+80$ mesh is placed on a 100 mesh screen with glassy beads. A 140 mesh screen and pan are placed underneath. After vibration for 10 minutes, the portion of the sample passing through the 100 and remaining on the 140 mesh screen is reported as "% breakage". The portion passing through the 140 mesh screen is called "% attrition." The sum of the two quantities is called friability. The friability of product typically varies from 1.0–3.7 percent depending on the operating conditions. This compares with a value of 2.5–6.0 percent for dense ash. Low values denote a superior product. Values greater than 10 are unacceptable.

Screen Analysis

Product prepared from dense ash is considerably coarser than the dense ash parent.

Table I

Screen Analysis of Dense Ash and Product

| Screen | Dense Ash % on Screen | Product % on Screen |
|---|---|---|
| +40 | 20.8 | 43.6 |
| −40 + 60 | 45.6 | 48.5 |
| +60 + 100 | 23.8 | 6.8 |
| −100 | 9.8 | 1.1 |

Chemical Composition of Product

Figure 2:
FIG. 2 is a photograph (magnification 50X) of product particles of the instant invention.

The chemical composition of the product can be varied from 50–100 weight percent Wegscheider's Salt, $Na_2CO_3.3NaHCO_3$. The balance is made up of sodium bicarbonate, $NaHCO_3$, sodium carbonate, $Na_2CO_3$, and sodium sesquicarbonate, $NaCO_3.NaHCO_3.2H_2O$. Qualitative chemical or spectrophotometric techniques are employed to identify the components present in a sample. Quantitative determination of percent composition is typically accomplished by X-ray analysis. The product is typically a mixture of greater than about 50 weight percent Wegscheider's Salt and lesser amounts of sodium bicarbonate and sodium sesquicarbonate. By comparisons of FIGS. 1 and 2, it is evident that the product particles from Example 9, shown in FIG. 2 have the general block hexagonal shape compact form of the parent dense ash shown in FIG. 1.

The following Examples are presented to further illustrate the present invention and set forth the best mode presently contemplated for its practice. Unless otherwise indicated parts are by weight.

EXAMPLES 1–9

GENERAL PROCEDURE

Thirty pounds of dense ash with a bulk density of 1100 g/l is charged into a V-shaped reactor equipped with a sparger placed in the center of the reactor cavity to maximize solid-gas contact, a thermowell to measure the temperature of the solid and a heating jacket to maintain the temperature of the walls and solids at least about 200° F. A motor and drive means is provided to rotate the reactor and continually force the solids to flow over the opening of the sparger. The sparger is connected to a source of carbon dioxide and steam which are passed through suitable flowmeters and valves to monitor and mix the gaseous mixture thoroughly before introduction to the reactor. Alternately, the reactor can be a suitably equipped solids processor able to withstand pressures of at least about 20 psig. An exit valve and gauge are provided to accurately monitor the pressure. The gaseous mixture vented from the reactor can be passed through a condenser to remove the water, and the carbon dioxide remaining can be recycled, vented or used in another process. Measurement of the temperature and pressure serves to monitor the extent of reaction. At completion of the exothermic reaction between the gaseous mixture and dense ash, the material temperature decreases; reactions with the gases ceased and the reactor pressure increases.

The experiments conducted at about 20 psig produce a material of higher absorbance, with superior flow properties and with a similar reduction in bulk densities in a shorter reaction time than those run near atmospheric pressure.

EXAMPLE 1

A modified 2.5 ft³, jacketed, double cone reactor is preheated to 200° F. before 30 lbs of light ash, having a bulk density of 550 g/l, is fed in, the reactor sealed, and rotation begun. Gas flow is started when the material temperature reaches 120° F. Steam is fed at 88 g/min and $CO_2$ at 51 g/min., as measured by flow-meters before mixing and entering the reactor through a sparger assembly. As the gases contact the light ash both the reactor pressure and the material temperature begin a steady rise until the pressure is 20 psig and the material temperature 250° F. After 80 minutes a decrease in the rate of reaction is noted by a decrease in the material temperature to below 235° F. and the experiment is concluded. The product is discharged, air dried, screened to remove lumps and analyzed. The results are summarized in Table II, below. A product having the proper chemical composition is produced, but this material does not have the proper hexagonal shape. Without this shape, the product possessed none of the good flow qualities and hence it was not acceptable.

EXAMPLE 2

Thirty pounds of dense ash, having a bulk density of about 1100 g/l, are fed into the preheated reactor described in Example 1. The operating pressure is maintained at atmospheric by proper venting. The feed gas composition is varied from one rich in steam at the beginning of the run to one with only a slight excess of steam when the temperature recorded indicated the exothermic reaction has begun. The product is discharged, air-dried, screened and analyzed. Analysis showed the product to be very friable and to have unacceptable flow qualities.

EXAMPLE 3

In an experiment analogous to Example 1, thirty pounds of dense ash are fed into a reactor, preheated to 150° F. The flow of steam and carbon dioxide is started when the material temperature reaches 150° F. Within 10 minutes the reactor pressure reached 20 psig and the material temperature was 210° F. After 15 minutes the temperature of above about 200° F. Steam is fed at a rate of 82 g/min and carbon dioxide at 48 g/min. Within 15 minutes the reactor pressure reached a maximum of 15 psig; the material temperature was 220° F. The material temperature continued to rise gradually and a maximum of 251° F. is attained after 60 minutes. After 75 minutes the reaction is stopped and the product discharged and air dried. The dried material is then screened to remove oversize and undersize material. The dried products possessed low bulk densities and acceptable flow properties. The results are summarized in Table II.

TABLE II
PRODUCTION OF WEGSCHEIDER'S SALT

| Example | Feed | Gas Composition | Total Pressure (psig) | Time (min) | Product Composition[1] Weg[2] | S.C.[3] | B.C.[4] | Bulk Density (g/l) | Absorbancy (%) | Flow (%) | Friability (%) |
|---|---|---|---|---|---|---|---|---|---|---|---|
| 1 | 30 lbs of Light Ash | A | 20 | 115 | 85 | 10 | 5 | 413 | 33 | 12 | — |
| 2 | 30 lbs of Dense Ash | B | 0 | 121 | 70 | 20 | 10 | 464 | 42 | 47 | 13.4 |
| 3* | " | A | 20 | 115 | 80 | 10 | 10 | 560 | 33 | 72 | 7.9 |
| 4* | " | A | 20 | 110 | 95 | 5 | 0$^a$ | 620 | 32 | — | — |
| 5 | 25 lbs of Dense Ash | C | 20 | 108 | 0$^a$ | 80 | 20 | 407 | 38 | 78 | 14.4 |
| 6 | 30 lbs of Dense Ash | A | 15 | 75 | 90 | 5 | 5 | 426 | 43 | 84 | 3.0 |
| 7 | " | A | 15 | 75 | 95 | 5 | 0$^a$ | 398 | 60 | 80 | 2.3 |
| 8 | " | A | 15 | 75 | 95 | 5 | 0$^a$ | 423 | 51 | 83 | 1.0 |
| 9 | " | A | 15 | 75 | 95 | 5 | 0$^a$ | 432 | 50 | 81 | 1.7 |

Gas Composition
A — 63%, ± 1%, by weight; $H_2O(g)$
37%, ± 1%, by weight, $CO_2(g)$
B — 67.2%–53.2% by weight; $H_2O(g)$
32.8%–46.8% by weight, $CO_2(g)$
C — 77%–79%, by weight; $H_2O(g)$
23%–21%, by weight, $CO_2(g)$
[1]By X-ray Analysis which is accurate to about ± 5%
[2]Wegscheider's salt ($Na_2CO_3 \cdot 3NaHCO_3$)
[3]Sodium sesquicarbonate ($Na_2CO_3 \cdot NaHCO_3 \cdot 2H_2O$)
[4]Sodium bicarbonate
*Reactor was preheated only to 150° F. before introduction of solids of gaseous mixture
$^a$Trace amount was present heat to the reactor jacket is shut off and the material temperature gradually climbed to 255° F. after 60 minutes. The pressure is maintained at 20 psig until the material temperature drops to 230° F. At this point the experiment is concluded and the product discharge, air dried. Due to caking of the material the flow properties were extremely poor.

EXAMPLE 4

This run was analogous to Example 3 except the air-dried product contained 95 weight percent Wegscheider's Salt. Since the reactor was preheated to only 150° F., the product exhibited unacceptable flow properties and had a bulk density of 620 g/l.

EXAMPLE 5

This Example was analogous to Example 1 except the gas composition is varied from 77 to 79 weight percent steam and 23 to 21 weight percent carbon dioxide. Athough the charge was smaller (25 lbs) than in Example 1 the reaction time was longer and product contained no Wegscheider's Salt.

EXAMPLES 6-9

These experiments were conducted in a 1.0ft$^3$ V-shaped solids processor. A steam jacket is used to maintan the reactor wall temperature at 200° F. Thirty pounds of dense ash, having a bulk density of 1100 g/l, are charged into the reactor. The reactor is sealed, rotation is begun and the solids are heated to a tempera-

We claim:

1. A method for the conversion of sodium carbonate, having a bulk density greater than 750 g/l into free-flowing, absorptive particles of Wegscheider's Salt, having a bulk density between 350 and 500 g/l which comprises:
   (a) introducing anhydrous sodium carbonate particles into a reaction zone, which is preheated to a temperature between about 200° and 275° F.;
   (b) heating said particles to a temperature between about 100° and 150° F.;
   (c) introducing into said reaction zone a gaseous mixture containing from about 45 to 70 weight percent steam and about 30 to 55 weight percent carbon dioxide;
   (d) intimately contacting said gaseous mixture with said particles while maintaining in said reaction zone a superatmospheric pressure of at least about 10 psig and a temperature between about 240° F. and about 275° F. until the contacted particles contain at least about 50 weight percent said Wegscheider's Salt product;
   (e) removing said contacted particles from said reaction zone;
   (f) drying those of said removed particles which have a free moisture content in excess of 5 percent by weight to reduce said moisture content to less than 5 percent by weight; and
   (g) recovering said particles.

2. The method as described in claim 1 wherein in step (c) the gaseous mixture contains from about 55 to 70 weight percent steam and about 30 to 45 weight percent carbon dioxide.

3. The method as described in claim 1 wherein in step (c) the gaseous mixture contains about 63 weight percent steam and 37 weight percent carbon dioxide.

4. The method as described in claim 1 wherein in step (d) the superatmospheric pressure is maintained from about 15 to 20 psig and the temperature at about 250° F.

5. The method as described in claim 1 wherein in step (d) the contacted particles contain about 85–100 weight percent Wegscheider's Salt product.

6. A method for the conversion of anhydrous sodium carbonate, having a bulk density greater than 750 g/l into free-flowing, absorptive particles of Wegscheider's Salt, having a bulk density between 350 and 500 g/l which comprises:
(a) introducing said anhydrous sodium carbonate particles into a reaction zone which is preheated to a temperature between about 200° and 275° F.;
(b) heating said particles to a temperature between about 100° F. and 150° F.;
(c) introducing into said reaction zone a gaseous mixture containing from about 55 to 70 weight percent steam and about 30 to 45 weight percent carbon dioxide;
(d) intimately contacting said gaseous mixture with said particles while maintaining in said reaction zone a superatmospheric pressure of about 15 to 20 psig and a temperature of about 250° F. until the contacted particles contain about 85–100 weight percent said Wegscheider's Salt product;
(e) removing said contacted particles from said reaction zone;
(f) drying those of said removed particles which have a free moisture content in excess of 5 percent by weight to reduce said moisture content to less than 5 percent by weight; and,
(g) recovering said particles.

7. The method as described in claim 6 wherein in step (c), the gaseous mixture contain about 63 weight percent steam and 37 weight percent carbon dioxide.

8. The method as described in claim 6 wherein, in step (f), the removed particles are dried in a current of air at a temperature of about 40° C.

* * * * *